April 3, 1951 V. A. LARSEN 2,547,475
MOTOR-DRIVEN ACTUATOR UNIT
Filed April 1, 1949 4 Sheets-Sheet 1
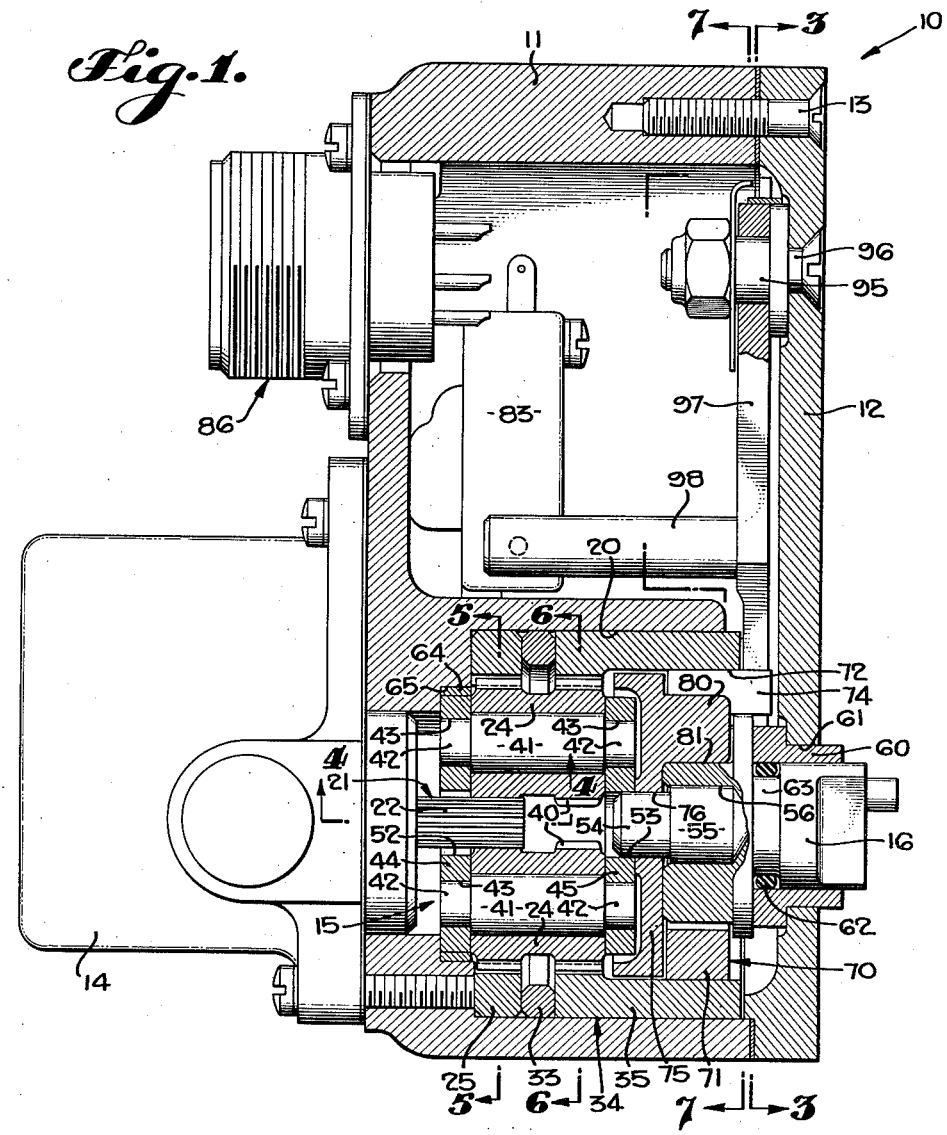
Fig.1.
INVENTOR.
VICTOR A. LARSEN
BY
ATTORNEY April 3, 1951 V. A. LARSEN 2,547,475
MOTOR-DRIVEN ACTUATOR UNIT
Filed April 1, 1949 4 Sheets-Sheet 2
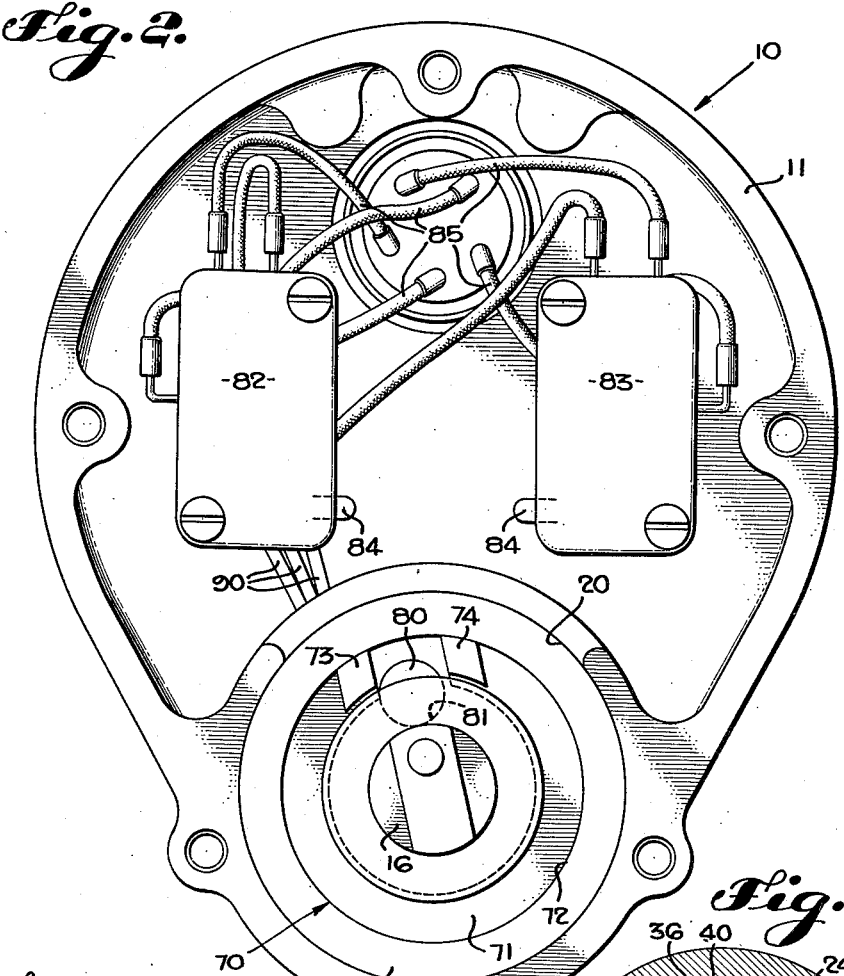
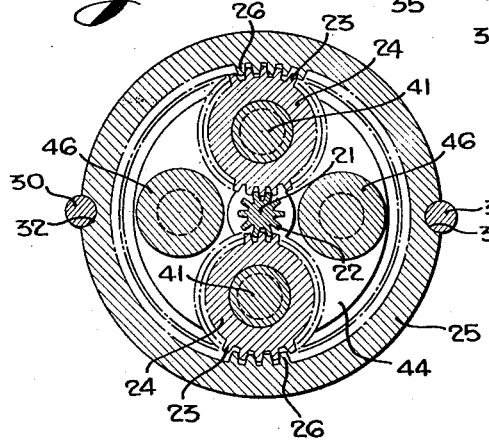
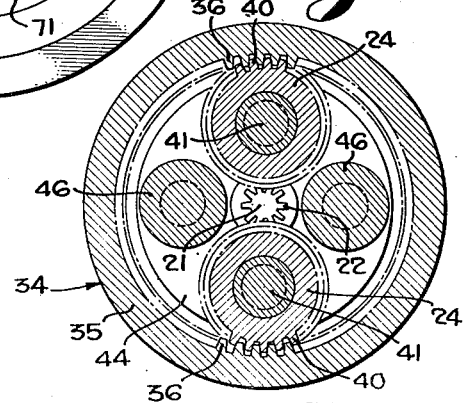
INVENTOR.
VICTOR A. LARSEN
BY
ATTORNEY April 3, 1951 V. A. LARSEN 2,547,475
MOTOR-DRIVEN ACTUATOR UNIT
Filed April 1, 1949 4 Sheets-Sheet 3

INVENTOR.
VICTOR A. LARSEN
BY
ATTORNEY

April 3, 1951 V. A. LARSEN 2,547,475
MOTOR-DRIVEN ACTUATOR UNIT
Filed April 1, 1949 4 Sheets-Sheet 4
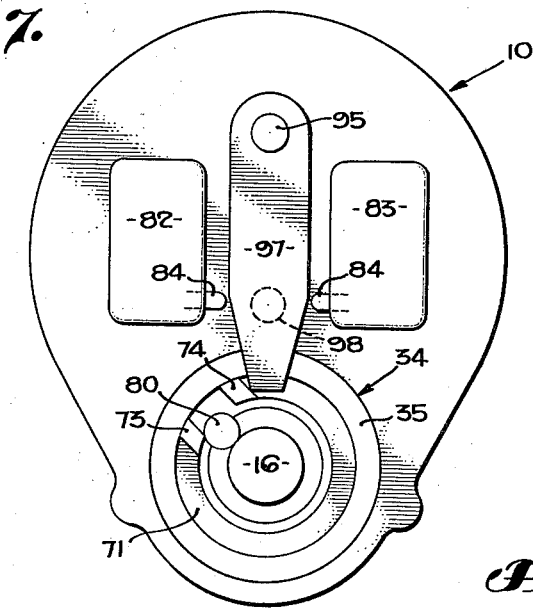
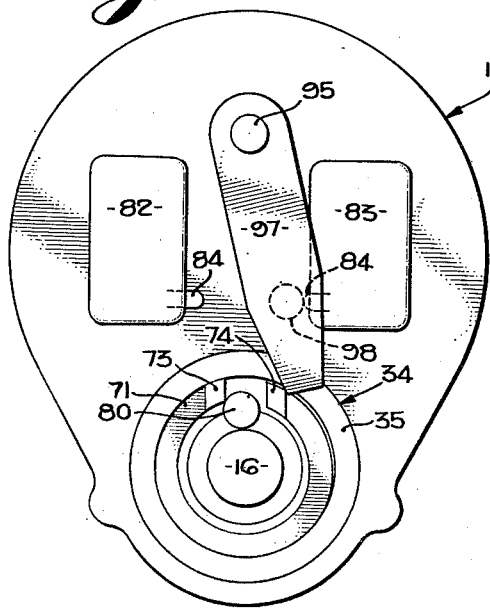
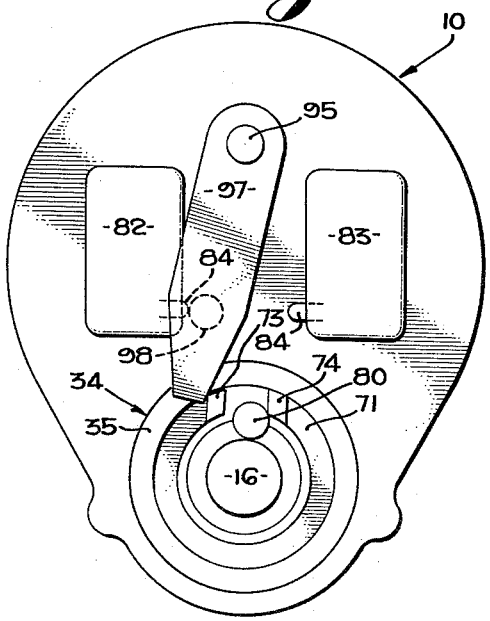
INVENTOR.
VICTOR A. LARSEN
BY
ATTORNEY Patented Apr. 3, 1951

2,547,475

UNITED STATES PATENT OFFICE 2,547,475

MOTOR-DRIVEN ACTUATOR UNIT

Victor A. Larsen, Altadena, Calif.

Application April 1, 1949, Serial No. 84,855

3 Claims. (Cl. 192—.02)

The present invention relates to motor-driven actuators for controlling valves or other mechanisms, and the primary object of the invention is to provide a light-weight, compact actuator unit which can be used to operate any valve or the like requiring successive control movements in opposite directions for a predetermined length of travel of the control member. While the principles of the invention are not limited to any specific use or type of installation, the preferred embodiment disclosed herein is particularly adapted for use in aircraft to operate a remote fluid shut-off valve, of the type shown and described in my copending application, Serial No. 82,829, filed March 22, 1949. In any unit designed for aircraft use, the matters of light weight, minimum bulk, and absolute reliability are of utmost importance, and it is in these three characteristics that the present invention excels.

Another important object of the invention is to provide a motor-driven actuator unit embodying a novel and improved gear reduction and clutch arrangement giving a very great speed reduction, with almost infinite ratios in a gear set occupying an extremely small space and having the minimum number of gears; and in which the driven member is stopped instantaneously at the end of its angular travel, while the high speed electric motor is declutched and allowed to coast by its own momentum to a gradual stop. The advantage of using such an extreme speed reduction lies in the fact that it permits the use of a very small, light-weight electric motor of the type turning at extremely high speeds to deliver a relatively large power output per unit of weight. The inertia of such a high speed motor armature and the great speed reduction of the gear set makes it virtually impossible to run the driven shaft member of the unit up against a limit stop at the end of its angular travel without damaging the gears, while direct braking of the motor drive shaft to stop the driven shaft member at an exact predetermined angular position involves slowing down the action of the actuator unit to an undesirable extent. In the present invention, the motor continues to operate at full speed until the driven shaft member comes up against a limit stop, whereupon the driven shaft member is stopped instantaneously at a predetermined angular position, while at the same instant a clutch in the transmission system is disengaged and a shut-off switch for the motor is operated, permitting the motor to coast to a gradual stop.

Another object of the invention is to provide a novel and improved friction clutch of simple design which is disengaged automatically upon completing a predetermined angular travel in either direction, and in which disengagement is effected by the abutment of certain portions of the clutch with limit stops or the equivalent. In the preferred form of the invention, the clutch member is in the form of a C-shaped spring which is disposed within a circular cavity in the driving member, and expands radially outward into frictional driving engagement therewith. One end of the clutch spring has a positive driving connection with the driven shaft member, while the other end thereof is engageable with a limit stop member as the driven shaft member approaches the end of its predetermined angular travel. The engagement of the said other end of the clutch spring with the limit stop member causes the clutch spring to contract slightly, thereby releasing the frictional driving engagement with the driving member. This clutch arrangement is exceedingly simple in construction, precise in its action, and absolutely reliable in operation.

The foregoing and other objects and advantages of the present invention will become apparent to those skilled in the art upon consideration of the following detailed description of the preferred embodiment thereof, reference being had to the accompanying drawings, wherein:

Figure 1 is a vertically sectioned view of an actuator unit embodying the principles of the invention;

Figure 2 is an end view into the same, with the cover plate removed;

Figure 5 is a transverse vertical section through the speed-reduction gear set, taken at 5—5 in Figure 1;

Figure 6 is another transverse vertical section through the gear set, taken at 6—6 in Figure 1;

Figure 7 is a more or less schematic view, as seen from 7—7 in Figure 1; showing the clutch spring engaging the pivoted arm as the driven shaft member approaches the end of its predetermined angular travel;

Figure 3:
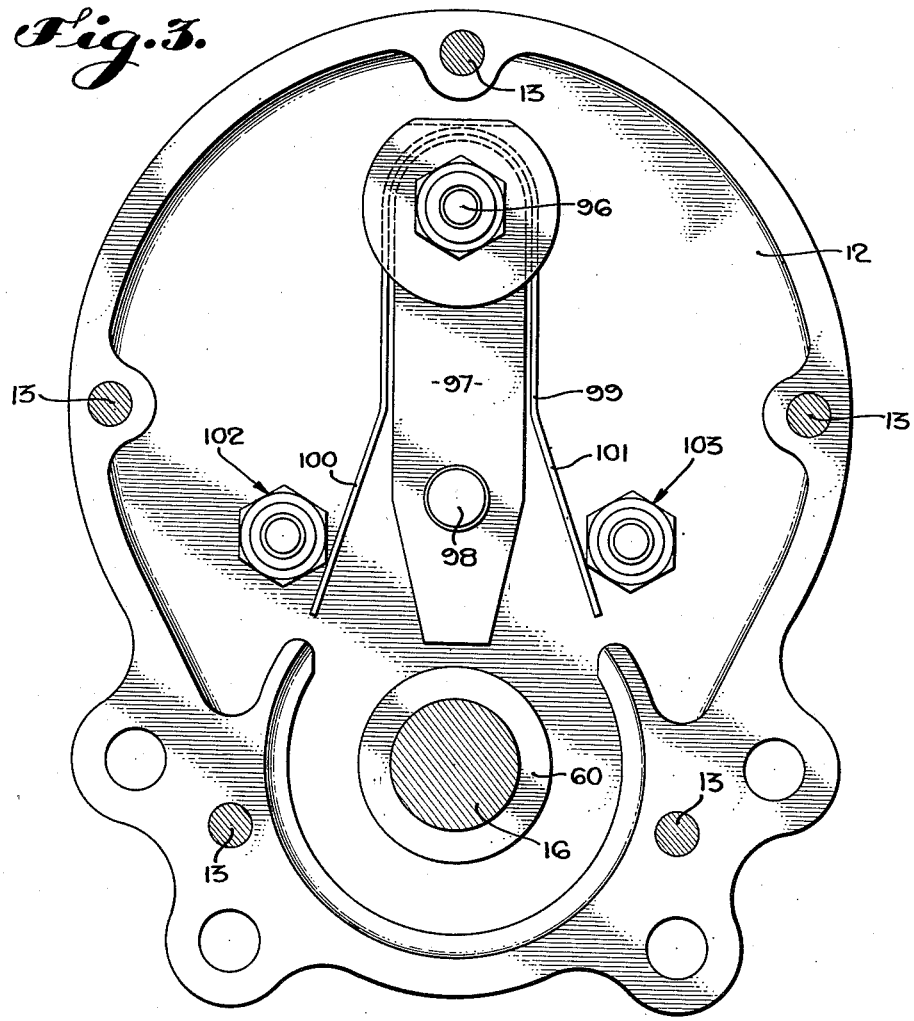
Figure 3 is a sectional view taken at 3—3 in Figure 1.

Figure 8 is another view of the same, showing the pivoted arm actuating one of the motor shut-off switches, while at the same time, the clutch spring is disengaged from its frictional driving engagement with the driven ring gear; and Figure 9 is another view of the same, showing the driven shaft member at the extremity of its angular travel in the other direction, with the pivoted arm actuating the other switch and at the same time disengaging the clutch spring from the driven ring gear member.

In the drawings, the actuator unit is designated in its entirety by the reference numeral 10, and is seen to comprise a housing 11 having a cover plate 12 attached thereto by screws 13. Mounted on the side of the housing 11 opposite the cover plate 12 is a high-speed, reversible electric motor 14 which is operatively connected through speed-reduction means 15 to a driven shaft member 16 to drive the latter at an extremely slow speed through a predetermined angular distance. The speed-reduction means 15 is preferably, although not necessarily, in the form of an epicyclic gear set which is contained within a cylindrical cavity 20 formed in the inside of the housing 11.

Figure 4:
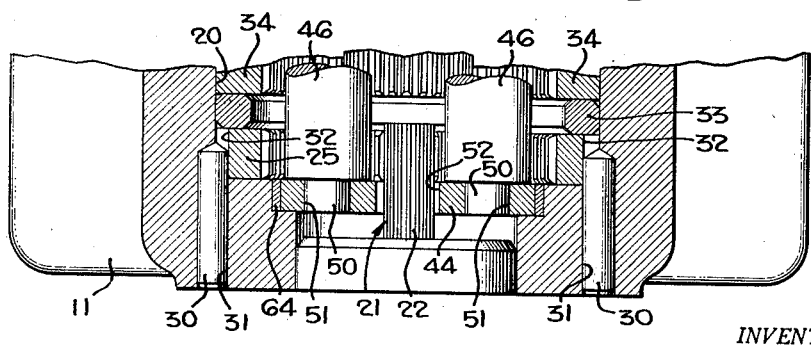
Figure 4 is a fragmentary sectional view taken at 4—4 in Figure 1.

The drive shaft 21 of the electric motor 14 projects into the cylindrical cavity 20 along the axis thereof, and is provided with gear teeth 22 which mesh with a row of teeth 23 on each of two planet gears 24. Seated in the bottom of the cavity 20 is a static ring gear 25 having teeth 26 which also mesh with the teeth 23 of planet gear 24. The static ring gear 25 is held against turning by means of two pins 30 (Figures 4 and 5) which are inserted into holes 31 in the housing on opposite sides of the cavity 20. The inner ends of the pins 30 project into the bottom of the cavity 20 and fit into half-round notches 32 in the outside circumference of the static ring gear 25 at diametrically opposite sides thereof. The pins 30 thus serve as keys to lock the static ring gear 25 against rotation relative to the housing 11. Seated within the cavity 20 and abutting against the static ring gear 25 is a bronze spacer ring 33, the outer end surface of which serves as an end thrust bearing for a driven ring gear member 34.

The driven ring gear member 34 is in the form of a cylindrical sleeve 35 which fits within the cavity 20 with just sufficient clearance to permit free rotation therein. Projecting radially inward from the end of the sleeve adjacent the spacer 33 are gear teeth 36 which mesh with teeth 40 on the planet gears 24. The driven ring gear 34 and static ring gear 25 are coaxial with respect to one another and to the toothed drive shaft 21; the latter constituting a sun gear about which the two planet gears 24 revolve.

Each of the two planet gears 24 is journaled for rotation on a short shaft 41, the ends 42 of which are cut down slightly in diameter and received within holes 43 in two axially spaced circular plates 44 and 45. Midway between the shafts 41 on opposite sides thereof are two spacer posts 46, the end portions 50 of which are also reduced in diameter and received within holes 51 in the plates 44 and 45. Both the shafts 41 and posts 46 have the same end-to-end dimensions between the shoulders formed by the reduced-diameter end portions, and the ends of the members 41, 46 are staked to the plates 44, 45 to form a rigid cage for the planet gears.

The plates 44 and 45 are provided with central apertures 52 and 53, respectively, and drive shaft 21 projects through aperture 52 to mesh with the planet gears 24. Aperture 53 in disk 45 receives a pilot 54 on the end of a plug 55 which is seated within a socket 56 in the back or inner end of the driven shaft member 16. The member 16 is journaled within a bronze sleeve bushing 60 which is pressed into a hole 61 in the cover plate 12, and an O-ring seal 62 seated within a circumferential groove 63 in the member 16 seals off the clearances between the member 16 and the bushing 60 so that moisture or vapors of any kind are prevented from entering the housing. The planet gear assembly is thus rotatably supported at its right hand end on the pilot 54 of plug 55 which is supported, in turn, by the driven shaft member 16 turning within bushing 60. The inner, or left hand end of the planet gear assembly is rotatably supported on a bushing sleeve 64 which is pressed into a shallow circular recess 65 at the bottom of the cavity 20. The outer circumference of the left hand plate 44 of the planet gear assembly runs on the bushing sleeve 64 and is supported thereby in the properly centered relationship with respect to the drive shaft 21 and ring gears 25 and 34.

The speed-reduction unit 15 disclosed herein is what is known as an epicyclic gear set, and is capable of giving almost infinite ratios of speed reduction in a unit of the size and class under consideration, wherein the pitch diameters of the ring gears are only a trifle more than one inch. This great speed reduction is obtained by virtue of extremely small differences in the pitch diameters of the static ring gear 25 and the driven ring gear 34, and by differences in the number of teeth in the two ring gears and in the two rows of teeth 23 and 40 in the planet gears. Speed reductions of a lower order may be obtained with two ring gears having the same diametral pitch, by merely reducing the number of teeth on one ring gear to one or two less than the number of teeth on the other ring gear.

To illustrate by way of example, assume that the teeth of all of the gears in the gear set have a 64 diametral pitch, and that the pitch diameters of the ring gears 25 and 34 are 1.09375 and 1.0625, respectively. The diametral pitch number is the number of teeth in a gear having a pitch diameter of one inch, and is therefore a measure of the size of the tooth. The static ring gear 25 thus has 70 teeth and the driven ring gear 34 has 68 teeth, since the number of teeth in a gear is found by multiplying the pitch diameter by the diametral pitch number. It will be found that the two rows of teeth 23 and 40 of the planet gears will mesh satisfactorily with the two ring gears 25 and 34 if pitch diameters of .4687 and .4375, respectively, are used. With a diametral pitch number of 64, this gives 30 teeth for row 23 of the planet gears, and 28 teeth for row 40. The gear set of the example just described gives a speed reduction of approximately 200 to 1.

For speed reductions of a higher order, the static ring gear 25 and teeth 23 of the planet gears may have one diametral pitch number, while the driven ring gear 35 and teeth 40 of the planet gears may have another diametral pitch number. For example, the static ring gear 25 may have a 64 diametral pitch, with a pitch diameter of 1.0625, and 68 teeth. The row of teeth 23 on the planet gears are likewise of 64 diametral pitch, and have a pitch diameter of .4531, which gives 29 teeth. The driven ring gear 34 has a 48 diametral pitch, with a pitch diameter of 1.0833, and 52 teeth. The row of teeth 40 on each of the planet gears 24 is also of 48 diametral pitch, and has a pitch diameter of .4583, which gives 22 teeth. The gear set of this last example gives a speed reduction of approximately 950 to 1.

The shaft member 16 is disconnectably coupled to the ring gear 34 by means of a friction clutch 70, and is driven thereby through a predetermined angular distance each time the actuator unit is operated. The clutch 70 may take any of several forms, but in the preferred embodiment illustrated herein, it is seen to comprise a generally circular, C-shaped clutch spring 71 which is disposed within the circular cavity 72 obtained within the interior of the sleeve portion 35 of the ring gear member 34. The circular cavity 72 is smoothly finished on its circumferential surface, and is concentric with the axis of rotation of the member 34. The clutch spring 71 is made slightly larger in outside diameter than the cavity 72, and its ends must be squeezed together slightly to contract the spring so that the same can be inserted into the cavity. When released, the clutch spring 71 expands radially outward into frictional driving engagement with the driven ring gear 34, and the latter thus becomes the driving member of the clutch assembly. Formed integrally with the ends of the clutch spring 71 are lugs 73 and 74 which project axially beyond the ends of the driven spring gears 34.

A circular disk member 75 is disposed between the inside end of the driven shaft member 16 and the adjacent end plate 45 of the planet gear assembly, and is apertured centrally at 79 to permit the pilot 54 to pass through. Projecting axially from the outer face of the member 75 is a cylindrical stud 80 which is seated within a half-round recess 81 in the perimeter of member 16. The stud 80 thus serves as a key to lock the members 75 and 16 together so that they rotate as one, and the outer half of the stud 80 projects above the peripheral surface of the member 16 between the lugs 73, 74 of spring 71. It will be noted that the distance between the lugs 73, 74 is slightly greater than the diameter of the stud 80, leaving a slight clearance between the stud and one of the lugs. When the ring gear member 34 is being driven in the clockwise direction, as viewed in Figure 2, lug 73 abuts against the stud 80 and the clutch spring 71 thus has a positive driving connection with the driven shaft member 16; while during counterclockwise rotation of the ring gear member 34, it is lug 74 that abuts against the stud.

Mounted within the upper part of the housing 11 and spaced symmetrically on either side of a vertical line drawn through the axis of the driven member 16 are two microswitches 82 and 83, each of which has an operating plunger 84 facing inwardly toward the centerline of the housing. The switches 82, 83 are connected by wires 85 to the contacts of a coupling socket 86, while other wires 90 connect the switches to the operating circuits of the motor 14. The switches 82, 83 are shut-off switches for the motor 14; one of the said switches being connected to the forward drive circuit of the motor to shut off the motor when the same is running in the forward direction, and the other switch being connected to the reverse drive circuit of the motor to shut off the motor when the same is running in the reverse direction.

Pivotally supported on a bushing 95, which is secured to the cover plate 12 by a screw 96, is an arm 97 that extends downwardly toward the driven shaft member 16. The arm 97 is positioned midway between the switches 82, 83, and its free end lies closely adjacent the perimeter of member 16 within the area swept by the projecting ends of the lugs 73, 74. Projecting from the arm 97 is a stud 98 which is positioned to engage the operating plungers 84 of the switches 82, 83 when the arm is swung to one side or the other.

The arm 97 is urged toward the centered position shown in Figure 3, by means of a generally U-shaped spring 99 which fits snugly over the upper end of the arm 97. The ends of the spring 99 are bent outwardly at 100 and 101, and engage limit stops 102 and 103, respectively, on the cover plate 12. Movement of the arm 97 toward the left (Figure 3) is resisted by flexion of the spring portion 100; while movement of the arm to the right is resisted by flexion of the spring portion 101. The limit stops 102, 103 are also engageable by the arm 97 to limit the swinging movement of the same in either direction.

A multi-conductor cable which is attached to the coupling socket 86 connects each of the wires 85 to one of the contacts of suitable switching means at the control station, or to indicator lights on the instrument panel which light up to show when the actuator unit is in operation. The aforesaid switching means at the control station functions to operate the motor 14 successively in the forward and reverse direction, which causes the driven ring gear member 34 to turn alternately in the clockwise and then counterclockwise direction.

When the driven ring gear member 34 is turning in the clockwise direction, the clutch spring 71 is frictionally engaged with the inside of sleeve portion 35, and the end of the clutch spring to which lug 73 is attached abuts against the stud 80 to provide a positive driving connection to the shaft member 16. As the rotating assembly approaches the end of its predetermined angular travel in the clockwise direction, the end of arm 97 is engaged by lug 74, as shown in Figure 7. The arm 97 is then pushed to the right, against the resistance of spring portion 101, until the arm engages limit stop 103. At this point, which is illustrated in Figure 8, the plunger 84 of switch 83 is depressed to shut off the motor, and at the same time, the end of the clutch spring 71 to which lug 74 is attached is bowed inwardly, contracting the clutch spring and thereby disengaging the same from its frictional driving engagement with the driven ring gear 34.

The next time that the motor 14 is operated, its direction of rotation is reversed, and the driven ring gear member 34 is made to turn in the counterclockwise direction, with lug 74 abutting against the stud 80 in a positive driving connection therewith to drive member 16. As the lug 74 on the clutch spring moves away from the arm 97, the latter is centered by the spring 99 to the position shown in Figure 3, and is then engaged from the other side by lug 73 as the driven shaft member 16 approaches the end of its angular travel in the counterclockwise direction. At the extremity of its angular travel, the lug 73 pushes the arm 97 against limit stop 102, depressing the plunger 84 of switch 82 to break the circuit to motor 14, and simultaneously disengaging the clutch spring 71 from its frictional engagement with ring gear 34. Thus, the motor is released to coast to a gradual stop at the same time that the member 16 is stopped instantaneously by arm 97 when the latter hits the limit stop.

In the embodiment illustrated herein, the driven member 16 turns through an angular distance of slightly less than one full revolution.

This angular travel may easily be increased or decreased by varying the placement of the switches 82, 83, or by varying the width of the arm 97. One highly advantageous feature of the invention is that the gear ratio can be changed quickly and easily by merely removing the ring gears 25 and 34, and the planet gear assembly from the cavity 20, and replacing them with other gears having different pitch diameters and numbers of teeth. This is accomplished by merely removing the cover plate 12 and inverting the housing so that the entire gear set, together with the clutch 70 and driven member 16, drops out. The new gears are then dropped into place in the cavity 20, after which the clutch 70 and driven member 16 are fitted into their respective parts, and finally the cover plate 12 is secured again to the body 11.

While I have shown and described in considerable detail what I believe to be the preferred form of my invention, it is to be understood that such details are not restrictive and that various changes may be made in the shape and arrangement of the several parts thereof without departing from the broad scope of the invention, as defined in the appended claims.

I claim:

1. An actuator unit comprising a housing, a motor, speed-reduction means contained within said housing and operatively connected to said motor, said speed-reduction means including a driven gear having a circular cavity formed therein concentric with its axis of rotation, a rotatable driven shaft member arranged coaxial with said driven gear and extending into said cavity; a C-shaped clutch spring surrounding said driven shaft member within said cavity and expanding radially outward into frictional driving engagement with said driven gear, one of the ends of said clutch spring having a positive driving connection with said driven shaft member, and means on said housing engageable by the other end of said clutch spring as said driven shaft member approaches the end of a predetermined angular travel, said means stopping said other end of said clutch spring and thereby contracting the spring so as to release the frictional driving engagement thereof with said driven gear member.

2. An actuator unit comprising a housing, a motor, speed-reduction means contained within said housing and operatively connected to said motor, said speed-reduction means including a driven gear having a circular cavity formed therein concentric with its axis of rotation, a rotatable driven shaft member arranged coaxial with said driven gear and extending into said cavity; a C-shaped clutch spring surrounding said driven shaft member within said cavity and expanding radially outward into frictional driving engagement with said driven gear; the ends of said clutch spring being formed with projections extending axially beyond the end of said driven gear, and one of the ends of said clutch spring having a positive driving connection with said driven shaft member, an arm pivoted on said housing and positioned so that its free end is engageable by and pushed ahead of the projection on the other end of said clutch spring as said driven shaft member approaches the end of a predetermined angular travel, a limit stop engageable by said arm to limit the swinging movement thereof, the engagement of said arm with said limit stop causing said other end of said clutch spring to stop and thereby contracting the spring so as to release the frictional driving engagement thereof with said driven gear, and means responsive to the swinging movement of said arm for shutting off said motor as said driven shaft member reaches the extremity of its angular travel.

3. An actuator unit comprising a housing, a high-speed reversible electric motor, speed-reduction means contained within said housing and operatively connected to said motor, said speed-reduction means including a driven gear having a circular cavity formed therein concentric with its axis of rotation, a rotatable driven shaft member arranged coaxial with said cavity, a C-shaped clutch spring surrounding said driven shaft member within said cavity and expanding radially outward into frictional driving engagement with said driven gear, the ends of said clutch spring being formed with projections extending axially beyond the end of said driven gear, and one of the ends of said clutch spring having a positive driving connection with said driven shaft member, a pair of laterally spaced switches disposed symmetrically on either side of a line drawn through the center of said driven shaft member; one of said switches being connected to the forward drive circuit of said motor to shut off the motor when the same is running in the forward direction, and the other of said switches being connected to the reverse drive circuit of said motor to shut off the motor when the same is running in the reverse direction, a spring-centered arm swingably supported on a pivot midway between said switches, the free end of said arm being engageable by and pushed ahead of one of the projections on the ends of said clutch spring as said driven shaft member approaches the end of a predetermined angular travel in either direction, and limit stop means on said housing engageable by said arm to limit the swinging movement thereof in either direction from the centered position, the engagement of said arm with said limit stop means causing said one projection to stop, thereby contracting said clutch spring so as to release the frictional driving engagement thereof with said driven gear, said arm being operable to actuate one or the other of said switches to shut off said motor as said driven shaft member reaches the extremity of its angular travel in either direction.

VICTOR A. LARSEN.

REFERENCES CITED

The following references are of record in the file of this patent:

UNITED STATES PATENTS

| Number | Name | Date |
|---|---|---|
| 819,890 | Kehoe | May 8, 1906 |
| 1,238,060 | Beyer | Aug. 21, 1917 |
| 2,226,227 | Hodges | Dec. 24, 1940 |
| 2,410,695 | Werner | Nov. 5, 1946 |
| 2,422,905 | Jackson | June 24, 1947 |

FOREIGN PATENTS

| Number | Country | Date |
|---|---|---|
| 15,925 | Great Britain | 1904 |